Aug. 26, 1958
G. HAGLUND
2,849,315
DIGESTION OF WOOD
Filed April 30, 1954
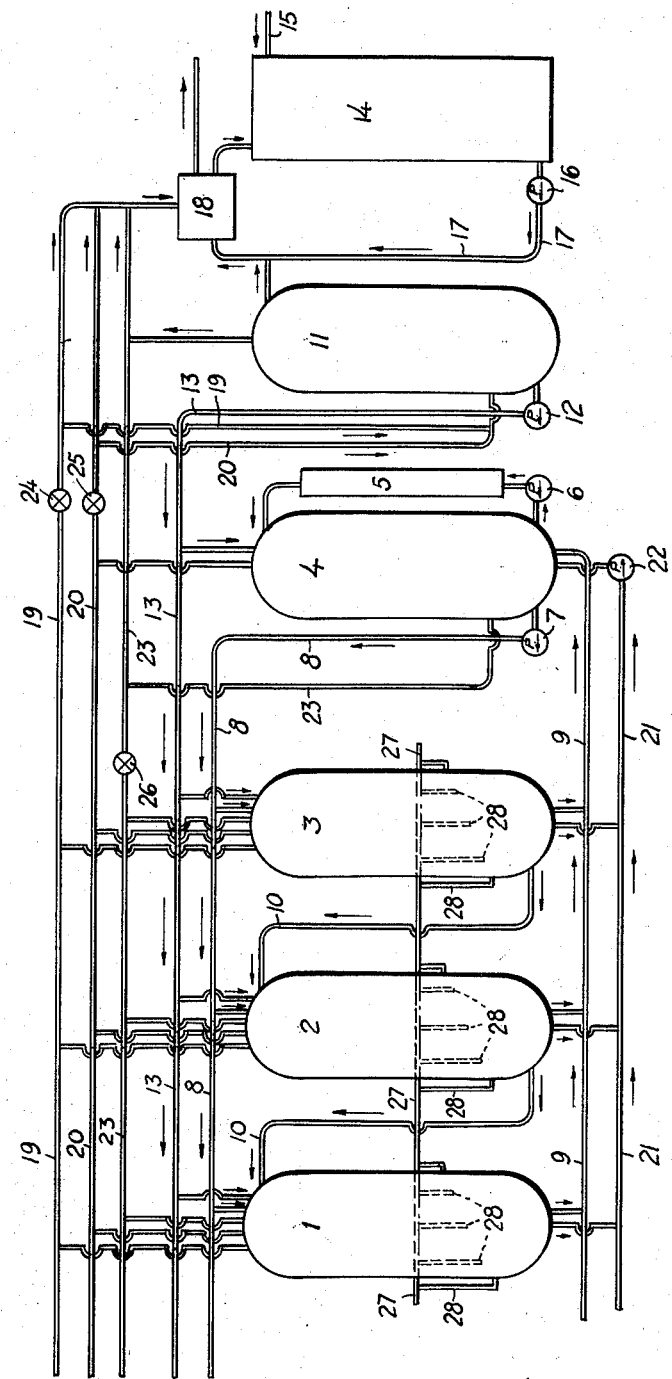
INVENTOR
Gustaf Haglund
BY Pierce, Scheffler & Parker
ATTORNEYS

United States Patent Office 2,849,315
Patented Aug. 26, 1958

2,849,315

DIGESTION OF WOOD

Gustaf Haglund, Storangen, Sweden

Application April 30, 1954, Serial No. 426,775

Claims priority, application Sweden May 7, 1953

2 Claims. (Cl. 92—11)

The present invention is for improvements in and relating to the digestion of wood, particularly by means of the sulfite method. The invention enables considerable savings in heat, power, time and chemicals to be made without the necessity of altering to a great extent the plants already available for the digestion of wood.

The raw material used in the manufacture of cellulose is such that, even if packed as much as possible when the digester is filled, a comparatively small quantity of cellulose is obtained for each cubic meter of the volume of the digester. For example, if spruce wood containing about 25% of moisture is used the digester as packed with chips contains about 247 kilograms of chips for each cubic meter of the digester volume. Of this 185 kilograms are solids and 62 kilograms are wood water, while the solids contain about 87 kilograms of recoverable 100% cellulose. It will be apparent that the cellulose recovered takes up a very insignificant portion of the volume of the digester, about 7% as solids, but still the digester must be filled to the top with cooking liquor and chips at the beginning of the digestion unless the chips are to be damaged or burnt during the first stage of the digestion. For the digestion there is required, in addition to the 247 kilograms already referred to, about 700 liters of cooking liquor for each cubic meter of the volume of the digester. Even so the chips contain a quantity of air and gases which is not negligible. The incrustation substances to be dissolved from the cellulose in order to liberate the latter amount to nearly as much as the quantity of cellulose, and therefore also this quantity is only a small proportion of the volume of the digester. In order to dissolve this amount of incrustation substances there is required for each cubic meter theoretically about 5 kilograms of base (CaO or $Na_2O$) as bisulfite. As this amount of bisulfite is to be supplied to the chips by means of the 700 liters of cooking liquor per cubic meter of the volume of the digester it will be seen that the bases are very diluted in the cooking liquors ordinarily used.

As far as the reaction itself is concerned it is not of advantage to use such diluted solutions. In the digestion of wood there is usually consumed from 30 to 50% more of the base than is theoretically necessary. The fact that the consumption varies so much in different plants as it does for the same kind of pulp shows that everything is not in order. The process of the present invention serves to reduce the consumption of chemicals.

As the volume of the cooking liquor must be very great relatively to the amount of cellulose recovered and as this liquor is prepared with water which must be raised to temperatures which as a rule are above 140° C. it will be seen that the consumption of heat in the digestion of cellulose is of great economic importance. The methods for heating and recovery of the heat are very important, and the present invention provides for considerable improvement in this respect.

The heating of such large liquid amounts to such an extent requires considerable time, and it is a question of the first importance to reduce the period of time required for the digestion. It is an object of the present invention to accomplish this.

In one aspect of the invention, in order to save heat, power, time and chemicals, the process is carried out in two stages. In the first stage and at a relatively lower temperature the wood, as a rule in the form of chips, is cooked with a cooking liquor containing a considerably greater amount of base than that required for carrying through the digestion. When the lignin has been sulfonated and the chips have ben soaked through, softened and settled to a considerably smaller volume a quantity of the cooking liquor is drawn off so that the remaining cooking liquor just covers the settled wood. In this liquor drawn off, as a rule only a comparatively small amount of the base present has been consumed. The digestion is then followed up in a second stage at a relatively higher temperature with the liquor remaining in the digester. The liquor used in the first stage should contain the base in such an amount that after the said withdrawal of liquor the liquor remaining in the digester contains the whole amount of base required for carrying through the second stage. In this second stage a larger amount of the base is consumed.

The two stages may with advantage be carried out in immediate succession after each other and in the same digester. They may, however, also be separated as regards the time and carried out in different digesters. It is not possible to set a definite limit at which the low temperature digestion should cease and the high temperature digestion commence, as this depends on the plant available, the characteristics of the cooking liquor available, the quality of the raw material and the quality of pulp desired.

In the first stage of the digestion the heating may be carried out as circulation heating, meaning that cooking liquor is withdrawn from the digester, heated and reintroduced into the digester, as a rule in a continuous cycle. In a very important aspect of the invention this heating is carried out in a heating central common to two or more digesters. In this way the consumption of steam and power is levelled out and lowered and the economy in general improved. This applies to the low temperature digestion, whereas in the high temperature digestion the heating is preferably carried out with direct steam supplied to each digester individually but preferably with improved introduction and distribution of the steam.

Further aspects of the invention will appear from the following detailed description of an embodiment of the invention as carried out in the plant illustrated in the accompanying drawing.

In the drawing 1, 2 and 3 denotes three digesters, each having a capacity of 100 cubic meters. 4 denotes a heating tank containing cooking liquor drawn off after the first stage of digestion and having a capacity of about 100 cubic meters. 5 denotes a heater connected to the heating tank 4 by means of pipe lines and the pump 6 which circulates the liquor in the heating tank through the heater 5. By means of this arrangement, the heating central, the liquor in the heating tank is held at a desired mean temperature of say 125° C. 7 denotes a pump which by means of pipes is connected to the heating tank 4 and through the pipe line 8 circulates liquor from the heating tank to the digesters in which low temperature digestion is taking place and from these through the pipe line 9 back to the heating tank. This circulation of heated cooking liquor through the digesters can be arranged to take place in series or in parallel. When series circulation is used the pipe lines 10 between the digesters are used. 11 is a tank for fresh cooking liquor in which raw acid is converted into cooking liquor by passing gases from the digesters through the same in order to obtain the desired content of free $SO_2$ and raising the temperature to say 80° C. The tank 11 should therefore have a corresponding pressure. The tank 11 is by means of a pipe line connected to the pump 12 by means of which cooking liquor may be pumped through the pipe lines 13 to any one of the digesters when these are to be filled with acid. 14 denotes a raw acid tank to which raw acid is supplied continuously through the pipe line 15 from the raw acid apparatus. The raw acid tank 14 is by means of a pipe line connected to the pump 16 which continuously pumps raw acid through the pipe line 17 which branches off and continuously supplies to the acid tank 11 a predetermined quantity of raw acid, whereas the rest of the acid passes through the absorber 18 and then back to the raw acid tank 14. The plant also comprises pipe lines, pumps and other equipment which will be referred to in describing the process. Such equipment as valves, drains and the like are not shown as the use thereof is well known in a plant for digestion of wood.

The digestion may be carried out as follows.

Digester 1 is filled with 24,700 kilograms of spruce wood chips containing 18,500 kilograms of solids and 6,200 kilograms of water. The chips have a temperature of 20° C. All inlets to and outlets from the digester are closed, but the valve to the gas and air line 19 leading to the absorber 18 is opened. Then the valve on the digester is opened which connects the digester with the acid line 13, and 35 cubic meters of acid from the cooking liquor tank 11 are filled into the digester at a temperature of 80° C. These 35 cubic meters contain twice as much of the base, as bisulfite, as would normally have been charged in 70 cubic meters in a digester of the same capacity. The free $SO_2$ content in the acid is higher than normal and the free $SO_2$ content is maintained, and levelled out, in a new manner to be described in the following. After charging the 35 cubic meters of acid into the digester the valves to the acid line 13 and to the gas air line 19 are closed. The valve connecting the digester to the low temperature line 20 is opened so that the gas space in the digester 1, the gas space in the heater tank 4 and the gas space in other digesters in which low temperature digestion is taking place are in communication with each other. The valve connecting the digester with the line 8, or the line 10, if low temperature digestion is taking place also in the nearest digester, is opened, whereby acid from the heating tank 4, directly or in series, is introduced into the digester 1. At the same time also the outlet valve of the digester 1 leading to the line 9 for returning circulating acid to the heating tank 4 has been opened. In this way the required additional amount of 35 cubic meters of acid from the heating tank is introduced into the digester 1, this acid having a temperature of 125° C. The digester 1 has now been supplied with the normal amount of acid, i. e. 70 cubic meters. Of these 35 cubic meters have been supplied from the acid tank 11 and 35 cubic meters from the heating tank 4. The filling of the digester is completed and the mean temperature in the digester is 85° C. Also, the low temperature digestion of the first stage has begun. It is to be noted, as will be explained in the following, that the acid from the heating tank consists of acid drawn off from a digester which has completed the low temperature digestion in a previous operation, and that this acid has a chemical composition which nearly corresponds to that of the acid in the digester 1 which has just been filled, after the completion of the low temperature digestion. When the digester 1 has been filled and the low temperature digestion therein has started low temperature digestion may also be carried out in one or more other digesters by means of circulation of acid. After acid circulation for a predetermined period of time digester 1 will reach the temperature of 125° C. prevailing in the heating tank 4 and reached earlier by the other digesters in which low temperature digestion is taking place. The space of time after which the digester is to reach the maximum low temperature is determined by the amount of acid circulated from the heating tank and by the heat transfer capacity of the heating tank. It is assumed in the present case that the digester 1 reaches the temperature of 125° C. after 2 hours and that this temperature should be maintained for 3 hours, meaning that the low temperature digestion should last for 5 hours. The other digesters are dealt with in the same manner, after predetermined intervals of time, and the various digesters therefore complete the low temperature digestion at predetermined intervals. All digesters in which low temperature digestion is taking place are connected with the circulation lines for acid from the heating tank and with the low temperature gas line 20, so that in all digesters the temperature and the free $SO_2$ content are levelled out. For the sake of simplicity only digester 1 will be dealt with in the following. When the circulation through digester 1 has been continued for 4 hours the inlet to and the outlet from the digester for the circulating acid are closed but the valve to the common low temperature line 20 is still open. The temperature in the digester is 125° C. A valve at the bottom of the digester leading to the drain line 2, the pump 22 and the heating tank 4 or the heater 5 is opened. While the digester 1 still has the pressure and the temperature of the low temperature digestion but is shut off from circulation 35 cubic meters of the acid content of digester 1 is drawn off through the line 21 with the aid of the pump 22 and transferred to the heating tank 4. The acid drawn off from the digester, i. e. 35 cubic meters having a temperature of 125° C., consists of acid having practically the same composition, the same temperature and the same volume as the acid supplied to the digester 1 when this was filled from the heating tank. In fact the acid has been loaned from the heating tank and is returned in the same state. The object of the low temperature digestion is to enable the wood to take up as much acid as possible and cause the wood to soften and settle or consolidate so as to take up a lesser volume without being packed to such an extent as to render the circulation difficult, further to cause the lignin to be sulfonated as far as possible without any substantial amount of wood substance being dissolved. After drawing off 35 cubic meters as stated above the remaining acid just about covers the settled wood.

The state at the end of the low temperature digestion and after drawing off the acid is noteworthy. The digester was filled with 24,700 kilograms of spruce wood chips having a temperature of 20° C. and containing 346,000 large calories, 35 cubic meters of acid having a temperature of 80° C. and containing 2,520,000 large calories and 35 cubic meters of acid from the heating tank having a temperature of 125° C. and containing 3,937,500 large calories. A total of 6,803,500 large calories corresponding to a temperature of 85° C. for the whole digester contents. The temperature was then raised to 125° C. by means of circulation, whereby 3,156,500 large calories were added to the digester content. The digester therefore contains 9,960,000 large calories before the acid is being drawn off. After drawing off 35 cubic meters of acid having a temperature of 125° C. and containing 3,937,500 large calories there remain in the digester 6,022,500 large calories or practically the same amount of heat as when the digestion started at 85° C. and at the beginning of the circulation. At the end of the low temperature digestion the digester contains 41.2 cubic meters of acid and 18,500 kilograms of organic solids (dissolved wood substance drawn off with the acid at the end of the low temperature digestion is supplied in the same amount when 35 cubic meters of acid are supplied to the digester at the beginning of the low temperature digestion). The high temperature digestion starts with this reduced digester content having a temperature of 125° C.

When the low temperature digestion is completed the wood is softened and has settled and is nearing defibration. In view of this and also in view of the smaller amount of liquor present in the digester exterior heating and circulation of cooking liquor is no longer practical, and the continued digestion is carried through by means of direct steam. Before the direct steam is introduced the operator should make sure that all inlets to and outlets from the digester are closed. The valve connecting the digester with the high temperature gas line 23 is then opened and direct steam is supplied from the line 27. The high temperature gas line 23 branches off to all the digesters so that the gas spaces of the digesters may be connected to the high temperature line 23. The line 23 further branches off to an inlet at the lower end of the heating tank 4. All in all there are three gas lines to which a digester is connected at various periods and at various pressures. The gas and air line 19 is used when the digester is being filled and on some occasions when gas is being drawn off, and for this reason has been provided with a controllable pressure valve 24 which is set at a pressure of for example 1 kilogram. The low temperature gas line 20 used for the low temperature digestion has a controllable pressure valve 25 which is set at a pressure of for example 5 kilograms. The high temperature gas line 23 used for the high temperature digestion has a controllable pressure valve 26 which is set at a pressure of for example 6 kilograms. The gases from the high temperature lines are passed into the heating tank 4 as long as the pressure conditions allow this to be done. The gases from the low temperature digestion are passed into the acid tank 11 as long as the pressure conditions allow this to be done, and to this tank are also passed in part gases liberated when the pressure is relieved. All gas lines end in the absorber 18 which takes care of all gases not absorbed in any other way by bringing them into contact with circulating raw acid before the final rest gas is passed to the raw acid plant.

When the digester 1 has been connected up to the high temperature gas line 23 direct steam is introduced from the steam line 27 and introduced into the digester through the branch pipes 28. These are preferably arranged so that they, in a number of for example eight, are uniformly distributed in the digester and end at different levels, within the lower third of the digester, to form a helical inlet for the steam. The temperature in the digester is raised from 125° C. to 145° C. during a period of time of 3 hours. At the end of 4 hours after the beginning of the high temperature digestion the digestion is assumed to be completed, the gases to have been let off and the digester to have been empited. If it is found that more acid can be drawn off from the digester then this can be done also during the high temperature digestion. At the beginning of the high temperature digestion, at a temperature of 125° C., the digester had a heat content of 6,022,500 large calories. After 3 hours the digester has a temperature of 145° C. and contains 6,986,100 large calories. The increase amount to 963,600 large calories which is only one third of the amount of heat, 3,156,500 large calories, supplied to the digester in the first stage of digestion by means of circulation and exterior heating. The amount of heat supplied per hour by means of direct steam amounts to only 321,200 large calories, which means a comparatively small consumption of direct steam, and this consumption of direct steam is fairly equally distributed over the whole time.

When filling the digester with hot acid, the $SO_2$ gas driven off as well as steam are passed through the gas air line 19 under control of the pressure valve 24 to the absorber 18 to be absorbed in the raw acid circulating therethrough. During the low temperature digestion the $SO_2$ gas driven off and steam are passed through the low temperature gas line 20 under control of the pressure valve 25 to the acid tank 11 to be absorbed in the cooking liquor present therein. During the high temperature digestion the $SO_2$ gas and steam formed are passed through the high temperature gas line 23 under control of the pressure valve 26 to the heating tank 4 for absorption in the acid present therein. The gases resulting from the lowering of the pressure are passed through the gas air line 19 to the acid tank 11 as long as permitted by the pressure conditions and then to the absorber 18. Gases not absorbed in the acid tank and all rest gases which are not recovered in any other way and which come from the digesters are passed to the absorber 18. This separation of exhaust gases from the digesters and allocation to suitable absorption means provides for a more complete recovery of $SO_2$ and heat than in the systems ordinarily used. It is particularly to be noted that by increasing the pressure difference between the low temperature and the high temperature digestion a very effective recovery from the high temperature to the low temperature digestion is obtained over the common central heating system.

It follows that for each batch the low temperature digestion required 3,156,500 large calories and the high temperature digestion 963,000 large calories which were supplied by means of direct and individual steam respectively. A total of 4,120,100 large calories. If the same digestion is carried out in the ordinary way and if the digester is filled with the same kind of wood, 24,700 kilograms at a temperature of 20° C., and then 70 cubic meters of cooking acid having a temperature of 80° C. are added, then the digester at the beginning of the digestion will have a temperature of 67° C. to be compared with 85° C. as according to the present invention. To raise the temperature of the digester to 145° C. requires 6,257,500 large calories to be compared with 4,120,100 large calories consumed in the process of the present invention, which constitutes only 66% of the heat, for the digestion, used in the ordinary practice. In reality the saving of heat is even greater as no account has been made of the heat which can be directly recovered from the high temperature digestion to the low temperature digestion, whereby also the recovery of $SO_2$ gas is considerably improved.

The consumption of heat and power is to a large extent levelled out, and this is particularly the case in respect of the low temperature digestion (in which the consumption of heat and power is largest) as a result of the central heating.

In the acid used for the low temperature digestion the bisulfite has a concentration which is so much higher as corresponds to the amount of acid drawn off at the end of the low temperature digestion, without affecting the actual amount of base required for digestion of the rest of the digester contents. As a matter of fact an amount of bisulfite is circulated in excess of that required for the digestion, and the strength of the liquor is kept up by adding the amounts of base actually consumed in the digestion. In this way the sulfonation of the lignin is made more complete and is accomplished in a shorter time. Also the time required for the digestion is shortened which serves to reduce the consumption of chemicals.

The final digestion takes place in a considerably reduced volume of acid, as compared with the volume ordinarily used, and this results in an increase of the contents of organic substances in the waste liquor corresponding to the difference in volume.

Modifications are possible within the scope of the invention. In some cases sodium may be used instead of calcium. The central heating has considerable advantages but the process may also be performed in a plant in which each digester is provided with a heater similar to the heater 5 or heated in any other way. The low temperature digestion may be carried out in one digester and then the digester contents transferred to another digester for the high temperature digestion, particularly if the digester is made for higher pressure and provided with suitable steam inlets for high temperature digestion. Such transfer of a batch from one digester to another means that the chips are defibrated in the blowing over operation which as a rule is not the intention. When blowing over the digester contents in this way from one digester to another after the low temperature digestion it is preferable that the wood should be pretreated before being subjected to the low temperature digestion. Pretreatment of the wood may consist in treating the chips with diluted alkaline solutions at low temperatures so that the wood is softened and can be mechanically disintegrated without any substantial damage to the fibers. Such a treatment of the chips saponifies the resin which can be washed out before the digestion and makes it possible to digest woods rich in resin to good quality sulfite pulp, and facilitates the digestion. The method of heating the digestion liquors centrally and circulating them to the digesters does not necessarily mean that the heating should be of the indirect kind, but direct heating results in a dilution of the digestion liquors which in most cases is not desirable. The system of using a central heating system for circulation and heating may of course be used with advantage in such cases where circulation digestion is practised.

It has been described in the foregoing how the digester after having been charged with chips is filled first with a quantity of acid from the acid tank 11 and then with a quantity of acid from the heating tank 4, so that the digester was completely filled and at the same time the low temperature digestion commenced. It is of course also possible to transfer the cooking acid from the tank 11 to the heating tank 4, continuously or discontinuously, but in the same amount in relation to the number of digesters started as described in the foregoing, and then fill the digesters with acid for the low temperature digestion in a single operation instead of in two operations. The digestion operations are not affected by this change of the method supplying the digester acid.

It will be understood that the temperatures and concentrations used will depend on the kind of pulp to be produced and other factors. In most cases, however, the temperature used in the first stage will be of the order of 110 to 125 or even 130° C., and in the second stage of the order of 120 to 150° C. As to the base the general rule is that when the first stage digestion commences the cooking liquor should contain approximately double the amount of base required for carrying the digestion to the end. In many cases this will mean that the base content of the cooking liquor when the first stage cooking commences will be of the order of 1.2 to 3%. The amount of base added at the start of a cook is controlled by the amount of fresh cooking liquor added and the base content thereof. Some of the base is consumed in the first stage digestion but after the withdrawal of liquor after completion of the first stage the content of base in the liquid remaining in the digester should always be sufficient for carrying through the second stage. The concentration of the cooking liquor when the second stages commences may vary considerably depending on many variables but in many cases will be of the order of 1.0 to 2.3%.

The application is intended to comprise all the steps described separately or in various combinations with each other in so far as these steps or combinations are new.

What I claim is:

1. A process for the digestion of wood to cellulose by means of the sulfite process, consisting in digesting the wood in a first stage at a temperature of the order of 110–130° C. with a cooking liquor containing a considerably higher amount of sulfite base material than that required for carrying through the digestion and made up of fresh cooking liquor and cooking liquor drawn off from a preceding first stage digestion, until the lignin has been sulfonated and the wood is soaked through, softened and settled but only a comparatively small amount of the incrustation substances has been dissolved out, drawing off so much cooking liquor that the remaining liquor substantially only covers the settled wood, completing the digestion of the wood in a second stage and at a higher temperature with the cooking liquor remaining in the digester so that only a relatively small amount of heat is required for heating to the temperature required for completing the digestion, the cooking liquor charged in the first stage containing such an amount of sulfite base material that after said drawing off of liquor at the end of the first stage the liquor remaining contains substantially the whole amount of sulfite base material required for completing the digestion and thus the digestion to defibration of the wood is completed in a liquor of high concentration, and supplying the cooking liquor drawn off at the end of the first stage while substantially maintaining the temperature thereof to a succeeding first stage digestion for recovery of the excess of sulfite base material therein and the heat thereof, the heating in the first stage being effected by withdrawing cooking liquors from a number of digesters, supplying them to a common central heating tank, holding the liquors in said central heating tank at a temperature of the order of 110–130° C., and returning the liquors to the digesters, so that the heating in the first stage is effected substantially solely by heat contained in said central heating tank.

2. A process for the digestion of wood to cellulose by means of the sulfite process, the digestion being carried out in a first stage a lower temperature and a second stage at a higher temperature, and in a plant comprising a number of digesters, an accumulator for fresh cooking liquor of high concentration, and a central heating tank for cooking liquor drawn off from a preceding first stage digestion, comprising filling a digester with wood chips, charging the digester with a volume of fresh cooking liquor from said accumulator considerably less than that required for covering the chips and with cooking liquor from said central heating tank, the total cooking liquor covering the chips and having a considerably higher content of sulfite base material than that required for carrying through the digestion to cellulose, proceeding in the same way with other digesters, heating the contents of the digesters in the first stage to a temperature of the order of 110–130° C. by withdrawing cooking liquors from the digesters, carrying them to said central heating tank, holding the liquor in said central heating tank at a temperature of the order of 110–130° C., and delivering liquor from said central heating tank individually to the digesters in such amounts as required to bring the temperature in each digester up to and maintain it at the said first stage temperature, so that the cooking in the digesters is controlled from said central heating tank and the digesters are heated substantially solely by heat from said central heating tank, interrupting the digestion before the fibres are decomposed and the cellulose fibres are liberated so that only small amounts of wood substance are dissolved but the lignin is sulfonated and the wood is soaked through, softened and settled, drawing off so much cooking liquor that the liquor remaining substantially only covers the settled chips and while retaining the temperature thereof supplying it to said central heating tank to be used in a following first stage digestion, and carrying through the second stage at a higher temperature with the liquor remaining in the digester and heating the digester contents by means of direct steam.

References Cited in the file of this patent

UNITED STATES PATENTS

| | | |
|---|---|---|
| Re. 18,200 | Haglund | Sept. 22, 1931 |
| 1,228,950 | Morterud | June 5, 1917 |
| 1,690,954 | Spencer | Nov. 6, 1928 |
| 1,859,847 | Rue | May 24, 1932 |
| 1,887,899 | Bradley et al. | Nov. 15, 1932 |

(Other references on following page)

UNITED STATES PATENTS

| | | |
|---|---|---|
| 1,901,706 | Dunbar | Mar. 14, 1933 |
| 1,918,459 | Dunbar et al. | July 18, 1933 |
| 1,943,289 | Christensen | Jan. 16, 1934 |
| 1,986,760 | Kreissler | Jan. 1, 1935 |
| 2,008,892 | Asplund | July 23, 1935 |
| 2,137,779 | Jones | Nov. 22, 1938 |
| 2,229,886 | Dunbar | Jan. 28, 1941 |
| 2,494,098 | Lockman | Jan. 10, 1950 |
| 2,671,727 | Westcott et al. | Mar. 9, 1954 |
| 2,675,311 | Natwick | Apr. 13, 1954 |

FOREIGN PATENTS

| | | |
|---|---|---|
| 848,039 | France | Oct. 20, 1939 |
| 861,963 | Germany | Jan. 8, 1953 |